(12) United States Patent
Jung et al.

(10) Patent No.: US 8,494,982 B2
(45) Date of Patent: Jul. 23, 2013

(54) EMOTION MODEL, APPARATUS, AND METHOD FOR ADAPTIVELY MODIFYING PERSONALITY FEATURES OF EMOTION MODEL

(75) Inventors: Hyun-Ryong Jung, Suwon-si (KR); Chien-Ming Huang, Atlanta, GA (US)

(73) Assignees: Samsung Electronics Co., Ltd., Suwon-si (KR); Georgia Tech Research Corporation, Atlanta, GA (US)

( * ) Notice: Subject to any disclaimer, the term of this patent is extended or adjusted under 35 U.S.C. 154(b) by 332 days.

(21) Appl. No.: 12/824,446

(22) Filed: Jun. 28, 2010

(65) Prior Publication Data

US 2011/0004577 A1 Jan. 6, 2011

(30) Foreign Application Priority Data

Jul. 2, 2009 (KR) .................. 10-2009-0060401

(51) Int. Cl.
*G06F 15/18* (2006.01)

(52) U.S. Cl.
USPC .......................................... 706/12

(58) Field of Classification Search
None
See application file for complete search history.

(56) References Cited

U.S. PATENT DOCUMENTS

| 6,212,502 | B1 * | 4/2001 | Ball et al. .................. 704/270 |
| 6,901,390 | B2 * | 5/2005 | Mizokawa .................... 706/14 |
| 7,944,448 | B2 * | 5/2011 | Iwamura et al. ............. 345/473 |
| 2003/0167167 | A1 | 9/2003 | Gong |
| 2006/0248461 | A1 * | 11/2006 | Yamada et al. .............. 715/706 |
| 2011/0112826 | A1 * | 5/2011 | Wang et al. .................. 704/9 |

FOREIGN PATENT DOCUMENTS

| JP | 2005-238422 | 9/2005 |
| KR | 10-2002-0067592 | 8/2002 |
| KR | 10-2006-0026297 | 3/2006 |
| WO | WO 02/37474 | 5/2002 |

OTHER PUBLICATIONS

Breazeal, Regulation and Entrainment in Human-Robot Interaction, 2001.*
Yu et al, Behavior Decision Model Based on Emotion and Dynamic Personality, Jun. 2005.*

* cited by examiner

*Primary Examiner* — Jeffrey A Gaffin
*Assistant Examiner* — Mikayla Chubb
(74) *Attorney, Agent, or Firm* — NSIP Law (57) ABSTRACT

Disclosed are an emotion model, and an apparatus and method for adaptively learning personality of the emotion model. The emotion model, which maintains personality information, creates emotion information according to the personality information and takes a predetermined behavior according to the emotion information. The personality information may change adaptively in correspondence to a user's response to the behavior performed by the emotion model. Accordingly, the emotion model may react adaptively to the user through interactions with the user.

18 Claims, 7 Drawing Sheets

EMOTION MODEL, APPARATUS, AND METHOD FOR ADAPTIVELY MODIFYING PERSONALITY FEATURES OF EMOTION MODEL

CROSS-REFERENCE TO RELATED APPLICATION(S)

This application claims the benefit under 35 U.S.C. §119 (a) of Korean Patent Application No. 10-2009-0060401, filed on Jul. 2, 2009, the disclosure of which is incorporated by reference in its entirety for all purposes.

BACKGROUND

1. Field

The following description relates to affective components that can be applied to robots, virtual characters, and the like.

2. Description of the Related Art

Recently, interests in robots that can imitate human behaviors are increasing. Such robots, termed "emotional robots" have been developed to exhibit specific emotions in response to external stimuli and make specific expressions or motions related to the emotions. For achieving this function, an emotional robot is generally programmed to have affective components.

Such affective components are composed of fixed, unchangeable personality characteristics and emotions which change according to external stimuli. For example, the emotions may change depending on sensor inputs and perceptual features.

A person's personality tends to change through education or by environmental factors. That is, a person's personality is learned under various conditions. Through such personality learning, a person develops abilities involving interacting with other people more tactfully and being more adaptive to surrounding environments and situations.

However, since affective components that have been applied to emotional robots, etc. are based on fixed, unchangeable personality characteristics, an emotional robot having such affective components tend to show unnatural, simple reactions in a practical situation even though it has been designed to exhibit behavior patterns very similar to human beings.

SUMMARY

The following description relates to an emotion model providing an adaptive personality based on user's responses, and an apparatus and method for adaptively modifying personality features of an emotion model.

In one general aspect, there is provided an emotion model including: an emotion creating unit configured to store personality information and create emotion information based on the personality information, a motion selector configured to select motion information for deciding a motion, based on the emotion information, a user's response receiver configured to receive a user's response to the motion corresponding to the motion information, and a is personality updating unit configured to create a learning parameter for the personality information using the user's response and update the personality information using the learning parameter.

The emotion creating unit may be further configured to provide dependency information, the dependency information being including a dependency relationship between the personality information and the emotion information, to the personality updating unit, and at least one of the emotion creating unit and the motion selector may be further configured to provide the emotion information to the personality updating unit. The personality updating unit may be further configured to: select personality information to be updated, using the emotion information and the dependency information, create a learning parameter for the selected personality information using the received user's response, and update the selected personality information using the learning parameter. The user's response may be classified as a positive response or a negative response of a particular intensity, and the personality updating unit may be further configured to classify the user's response as the positive response or the negative response with reference to a response classification tree. The personality information may include a personality characteristic and an intensity for the personality characteristic, and the learning parameter may include a gain amount which adjusts the intensity of the personality characteristic.

In another general aspect, there is provided a personality learning apparatus for an emotion model, including: a first memory configured to store emotion information created based on personality information, and a user's response to a motion corresponding to motion information selected based on the emotion information, a second memory configured to store dependency information relating to a dependency relationship between the emotion information and the personality information, and a learning controller configured to select personality information to have to be updated, using the emotion information and the dependency information, to generate a learning parameter for the selected personality information using the is user's response, and to update the selected personality information using the learning parameter.

The user's response may be classified as a positive response or a negative response of a particular intensity, and the second memory unit may be further configured to store a response classification tree to classify the user's response. The learning controller may be further configured to classify the user's response as the positive response or the negative response with reference to the response classification tree. The personality information may include a personality characteristic and an intensity for the personality characteristic, and the learning parameter may include a gain amount which adjusts the intensity of the personality characteristic.

In another general aspect, there is provided a personality learning method which is performed by an emotion model, including: creating emotion information based on personality information, selecting motion information for deciding a motion, based on the emotion information, receiving a user's response to the motion corresponding to the motion information, and selecting personality information to be updated using the emotion information and the dependency information, the dependency information relating to a dependency relationship between the personality information and the emotion information, generating a learning parameter for the selected personality information using the user's response, and updating the selected personality information using the learning parameter.

The updating of the personality information may include classifying the user's response as a positive response or a negative response of a particular intensity. The personality information may include a personality characteristic and an intensity for the personality characteristic, and the learning parameter may include a gain amount which adjusts the intensity of the personality characteristic.

In another general aspect, there is provided a personality learning method which is performed by an emotion model, including: selecting a personality characteristic of personality information to be updated, using emotion information and dependency information relating to a is dependency relationship between the emotion information and the personality information, generating a learning parameter for the selected personality characteristic using a user's response, and updating an intensity of the selected personality characteristic using the learning parameter. The generating of the learning parameter may include classifying the user's response as a positive response or a negative response of a particular intensity.

Other objects, features, aspects, and advantages will be apparent from the following description, the drawings, and the claims.

BRIEF DESCRIPTION OF THE DRAWINGS

Elements, features, and structures are denoted by the same reference numerals throughout the drawings and the detailed description, and the relative size and depiction of some elements may be exaggerated in the drawings for clarity, illustration, and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. The progression of processing is steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
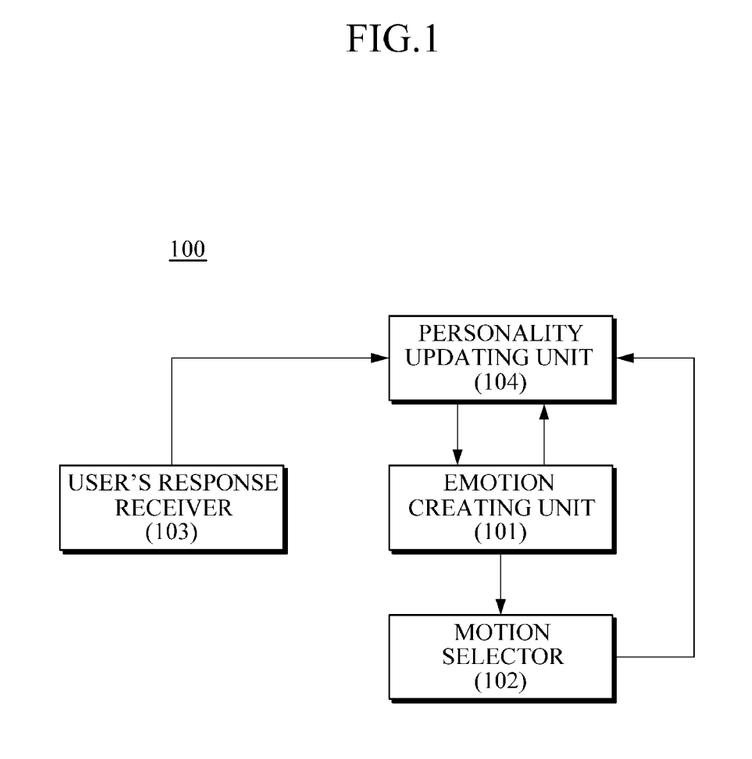
FIG. 1 is a block diagram illustrating a configuration of an example emotion model.

FIG. 1 is a block diagram illustrating a configuration of an example emotion model 100.

The emotion model 100 may be a system that expresses specific emotions in response to external stimuli and makes specific expressions or motions related to the emotions. For example, the emotion model 100 may be a humanoid robot or pet robot capable of responding to external stimuli or an arbitrary terminal capable of displaying 3D virtual characters.

Referring to FIG. 1, the emotion model 100 may include an emotion creating unit 101, a motion selector 102, a user's response receiver 103, and a personality updating unit 104.

The emotion creating unit 101 may store personality information and creates emotion information in correspondence to external stimuli based on the personality information. The external stimuli may be the results of cognition on external environments, which are acquired from various sensors, cameras or the like.

For example, when the emotion model 100 is for pet robot and a user pats the pet robot, the emotion creating unit 101 may generate an emotion parameter indicating "Happiness" in response to the touch of the user's hand. In the current embodiment, the emotion information may be an emotion parameter representing a specific emotional state.

The emotion information may depend on the stored personality information. We know empirically that intensities of emotional expressions are different according to individual personalities. For example, when an introverted person and an extroverted person are both exposed to the same degree of stress, the extroverted person may openly display a stronger emotional expression against the stress than the introverted person.

The emotion model 100 may maintain such personality information, which may be stored in the emotion creating unit 101. Accordingly, the same kind of pet robots may create, if different pieces of personality information are respectively stored in their emotion creating units, different emotion information even though they have received the same stimulus.

A dependency relation between the personality information and emotion information is referred to as dependency information. In other words, dependency information may be a logic flow or restrictions rule which is used to create certain emotion information based on personality information.

The motion selector 102 may select predetermined motion information according to the created emotion information and allows the emotion model to operate according to the motion information. The motion information may be a motion parameter for deciding a behavior pattern that the emotion model 100 can take. That is, the emotion model 100 may decide a behavior based on motion information, and the motion information may be selected according to emotion information which is in a dependency relationship with personality information.

The user's response receiver 103 may receive a user's response in correspondence to a predetermined motion that has been performed according to selected motion information. For example, when a pet robot barks while wagging its tail according to selected motion information, a user's response of patting the pet robot as a compliment or of punishing it because of noisy barking may be received. Then, the user's response may be classified into a predetermined intensity of positive or negative response.

The personality updating unit 104 may receive dependency information between the personality information and emotion information from the emotion creating unit 101, receive the selected motion information and emotion information used to select the motion information from the motion selector 102, and receive a user's response through the user's response receiver 103. Alternatively, the emotion information may be supplied form the emotion creating unit 101.

The personality updating unit 104 may decide personality information that is to be updated based on the received emotion information and dependency information. Then, the personality updating unit 104 may calculate a learning parameter for the decided personality information using the received user's response, and update the personality information using the learning parameter.

The personality information may include personality characteristics, such as Extroversion, Openness, Conscientiousness, Agreeableness, and Neuroticism, and intensities for the individual personality characteristics. For example, the personality updating unit 104 may select personality characteristics configuring personality information using received emotion information and dependency information, and adjust intensities of the selected personality characteristics using calculated learning parameters. As an example, each learning parameter may be defined as a gain amount which adjusts an intensity of a personality characteristic.

Figure 2:
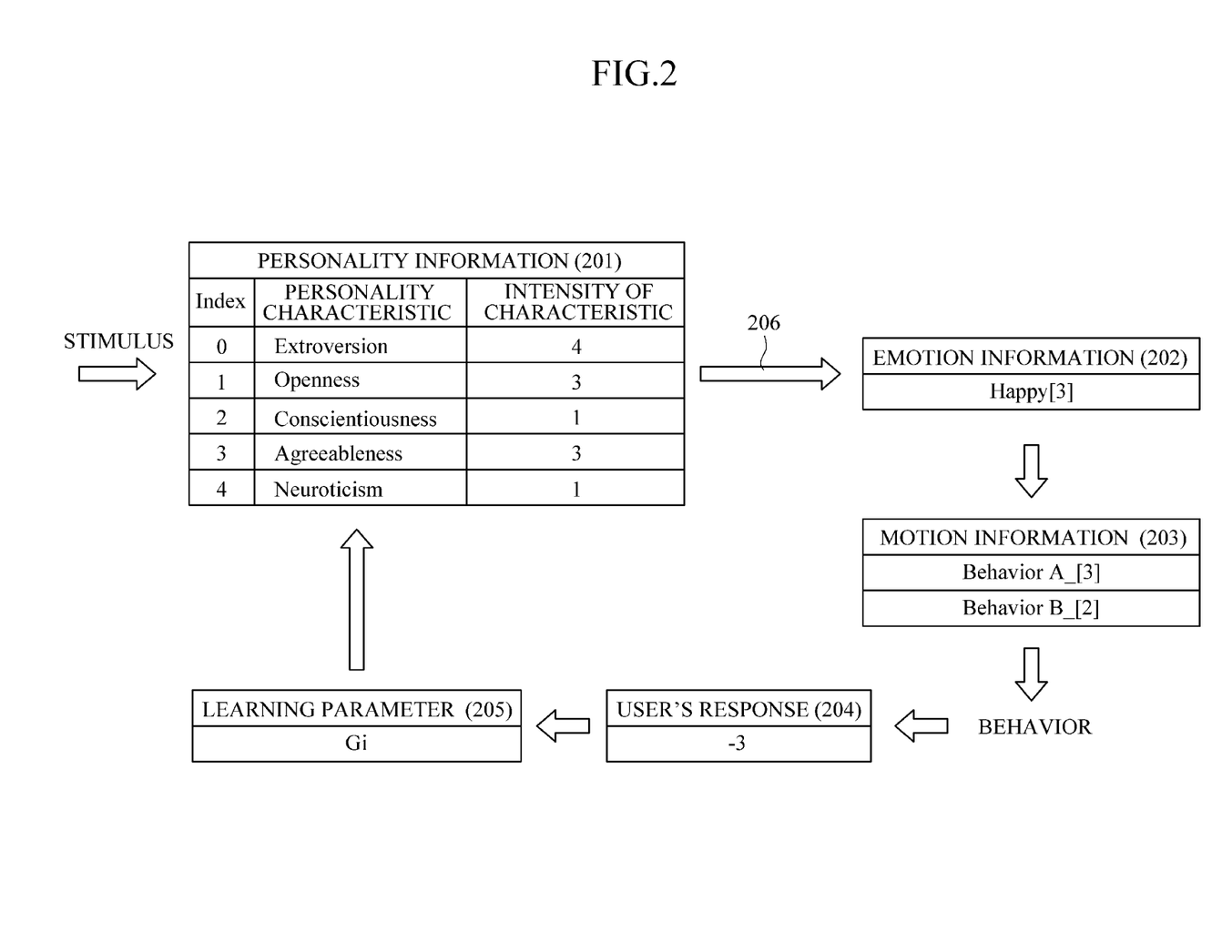
FIG. 2 is a view for explaining operation of the emotion model.

FIG. 2 is a view for explaining operation of the emotion model 100 of FIG. 1.

Referring to FIG. 2, the emotion model 100 may maintain personality information 201. The personality information 201 may include personality characteristics, such as Extroversion, Openness, Conscientiousness, Agreeableness, and Neuroticism, and intensities for the individual personality characteristics. The personality information 201 may be stored in the emotion creating unit 101 of FIG. 1.

In one example embodiment, the emotion model 100 is presumed to be for a pet robot dog.

The emotion creating unit 101 installed in the pet robot dog may create, when receiving a certain stimulus, emotion information 202 based on the received stimulus and personality information 201. For example, when a user pats the pet robot dog, the emotion creating unit 101 may generate an emotion parameter such as "Happy[3]." "Happy[3]," which is a type of emotion, indicates a feeling of happiness having an intensity level 3. At this time, the emotion information 202 may be created depending on the personality information 201. As mentioned above, the dependency relationship between the emotion information 202 and personality information 201 may be represented as dependency information.

Then, the motion selector 102 may select motion information to decide behaviors or actions that the pet robot dog can make, based on the emotion information 202 received from the emotion creating unit 101. For example, the motion selector 102 may select motion parameters, such as "Behavior A_[3]" or "Behavior B_[2]." The motion parameter "Behavior A_[3]" may represent a behavior of wagging a tail at a speed of level 3, and the motion parameter "Behavior B_[2]" may represent a behavior of barking with a sound intensity of level 2. Accordingly, in response to both the motion parameters "Behavior A_[3]" and "Behavior B_[2]" being selected, the pet robot dog may bark with a sound intensity of level 2 while wagging its tail at a speed of level 3.

The user's response receiver 103 may receive a user's response 204 and transfer it to the personality updating unit 104. For example, the user's response 204 may be classified as a predetermined intensity of positive or negative response. For example, an affirmative reaction from a user may be classified as a positive response and a negative reaction from a user may be classified as a negative response. The intensity level of each response may represent a degree of positivity or negativity. When the pet robot dog barks while wagging its tail, if a user punishes, the pet robot dog because of the noisy barking, the user's response may be classified as a negative response "−3." The user's response may be classified with reference to a predetermined response classification tree through the personality updating unit 104.

The personality updating unit 104 may generate a learning parameter 205 using the user's response 204 and update the personality information 201 using the learning parameter 205. The learning parameter 205 may be a gain amount $G_i$ which adjusts a characteristic intensity of the is personality information 201, wherein a subscript i represents a personality characteristic, and for what personality characteristic the characteristic intensity has to be adjusted may be determined based on the created emotion information 202 and dependency information. For example, in the case where a user punishes the pet robot dog when it barks while wagging the tail, it is possible that personality characteristics that have previously determined the emotion information 202 of "Happy[3]" are selected and the characteristic intensities of the selected personality characteristics are adjusted. For example, if the cause of the emotion information "Happy[3]" being induced is Extroversion, the learning parameter 205 may be used to reduce a characteristic intensity of Extroversion.

Accordingly, thereafter, when the pet robot dog is exposed to similar stimulus such as patting, different emotion information from the previously created emotion information may be created since the personality information 201 has adaptively changed, and accordingly, the pet robot dog may wag its tail without barking or while barking more quietly.

Figure 3:
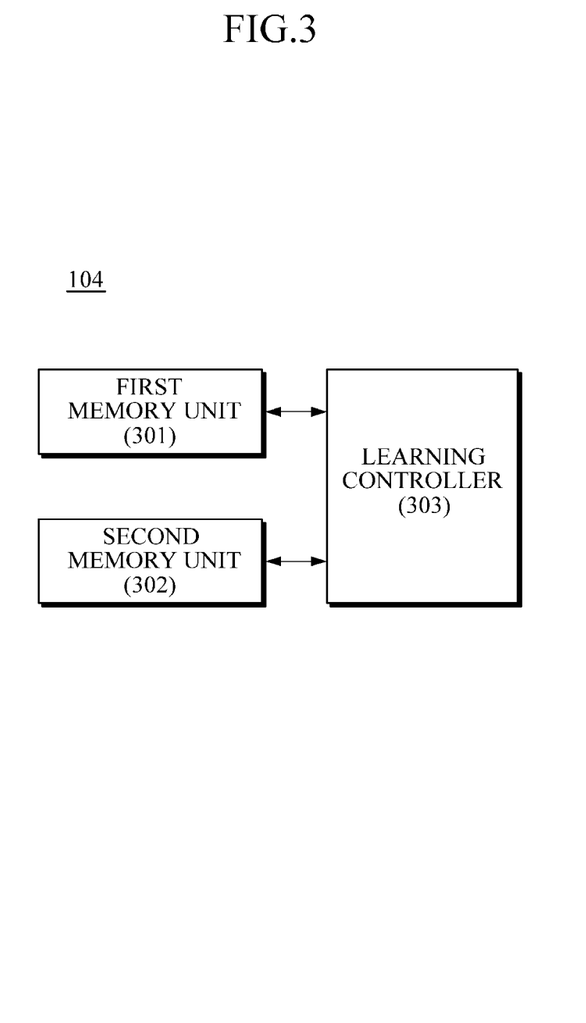
FIG. 3 is a block diagram illustrating a configuration of an example personality learning apparatus.

FIG. 3 is a block diagram illustrating a configuration of an example personality learning apparatus. The personality learning apparatus may be the personality updating unit 104 illustrated in FIG. 1.

The personality updating unit 104 may include a first memory 301, a second memory 302 and a learning controller 303.

The first memory 301 may be a memory to store current motion information, emotion information used to decide the current motion information and a user's responses corresponding to the current motion information. For example, referring to FIG. 2, the current motion information may correspond to the reference number 203, the emotion information used to decide the current motion information may correspond to the reference number 202 and the user's response corresponding to the current motion information may correspond to the reference number 204. The motion information may be received from the motion selector 102, and the is emotion information may be received from the motion selector 102 or from the emotion creating unit 101. Also, the user's response may be received from the user's response receiver 103 and stored as a predetermined negative or positive value.

The second memory 302 may be a long-term memory which stores dependency information between personality information and emotion information and a response classification tree used to classify a user's responses. For example, the dependency information may be received from the emotion creating unit 101 and stored in the second memory 302.

The learning controller 303 may decide personality information that has to be updated, with reference to the emotion information stored in the first memory 301 and the dependency information stored in the second memory 302. For example, referring to FIG. 2, the learning controller 303 may select an index number corresponding to a personality characteristic of the personality information 201.

In addition, the learning controller 303 may generate a learning parameter using a user's response stored in the first memory 301.

For example, the learning parameter may be calculated by Equation 1.

$$G_i(x) = \frac{a_i}{1+e^{-s_i \cdot x_i}} \cdot (-1)^{r_i} \quad \text{[Equation 1]}$$

$$(x \neq 0, \text{ if } x = 0, G_i(x) = 0)$$

Here, G represents the learning parameter; x represents the user's response and may be a positive or negative response with a predetermined intensity level; and i represents personality information that has to be updated, that is, a personality characteristic corresponding to a selected index number as illustrated in FIG. 2. Also, a represents a range in which the personality information changes according to the learning parameter, wherein the greater the a value, the is wider the range of change of the personality information; s represents a learning rate to adjust a speed of learning; and r is set as an even number (for example, "2") if the user's response is positive (that is, a positive response value) and as an odd number (for example, "1") if the user's response is negative (that is, a negative response value).

It is seen from Equation 1 that since the gain function is expressed by a sigmoid function, the gain value varies sharply depending on the x value but converges toward a specific value if the x value deviates from a predetermined range.

Also, the learning controller 303 may update the personality information using the learning parameter. For example, the learning controller 303 may adjust the intensity of a selected personality characteristic as follows.

$$P_i' = P_i + G_i(x) \quad \text{[Equation 2]}$$

In Equation 2, P represents initial personality information and $P_i'$ represents updated personality information. For example, $P_i$ may be a characteristic intensity for an $i^{th}$ personality characteristic.

In this way, personality information may be adaptively changed according to a user's response, and the changed personality information has influence on emotion information that is to be created and also on a behavior pattern that is to be made according to emotion information.

Figure 4:
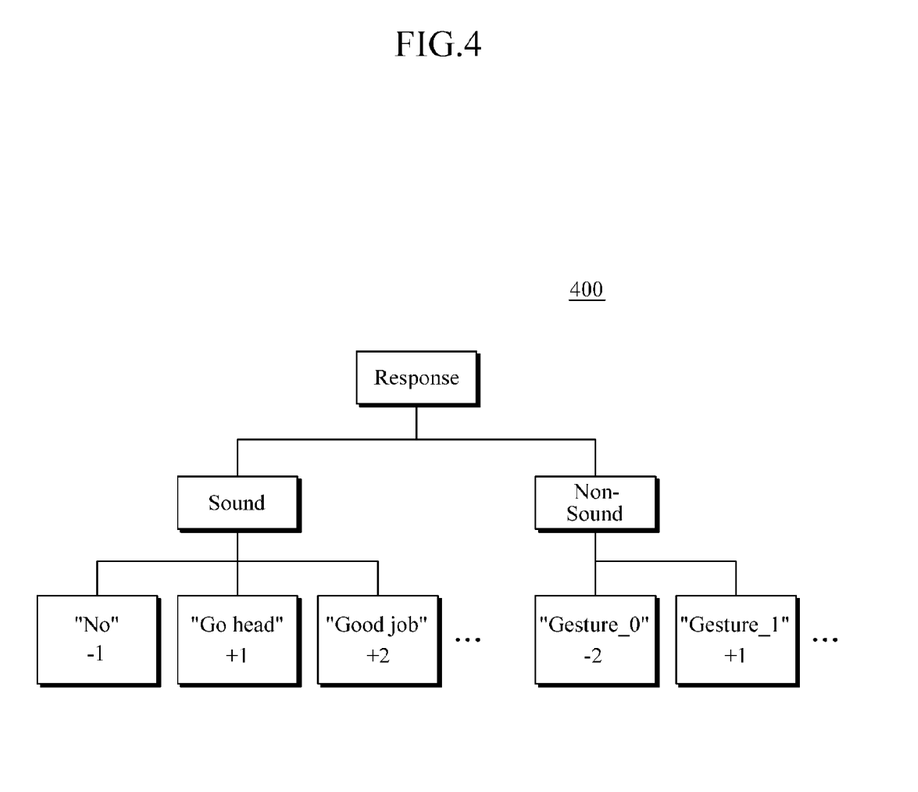
FIG. 4 shows an example user's response classification tree.

FIG. 4 shows an example user's response classification tree 400.

The user's response classification tree 400 may be stored in the second memory 302, and the learning controller 303 may quantify the x value (that is, a user's response) of Equation 1 with reference to the user's response classification tree 400 (see FIG. 3).

Referring to FIGS. 3 and 4, the learning controller 303 may receive a user's response from the user's response receiver 103 and determine whether the user's response is a voiced response or a non-voiced response. If the user's response is a voiced response, a response value may be calculated through speech analysis or text analysis, and if the user's response is a non-voiced response, a response value may be calculated through image analysis.

The response value may be a positive or negative number, wherein the positive number is mapped with respect to a positive response and the negative number is mapped with respect to a negative response.

For example, if a user says, "Good job," when the emotion model 100 takes a certain motion, a response value "+1" may be created. The response value "+1" may be used as the x value of Equation 1.

Figure 5:
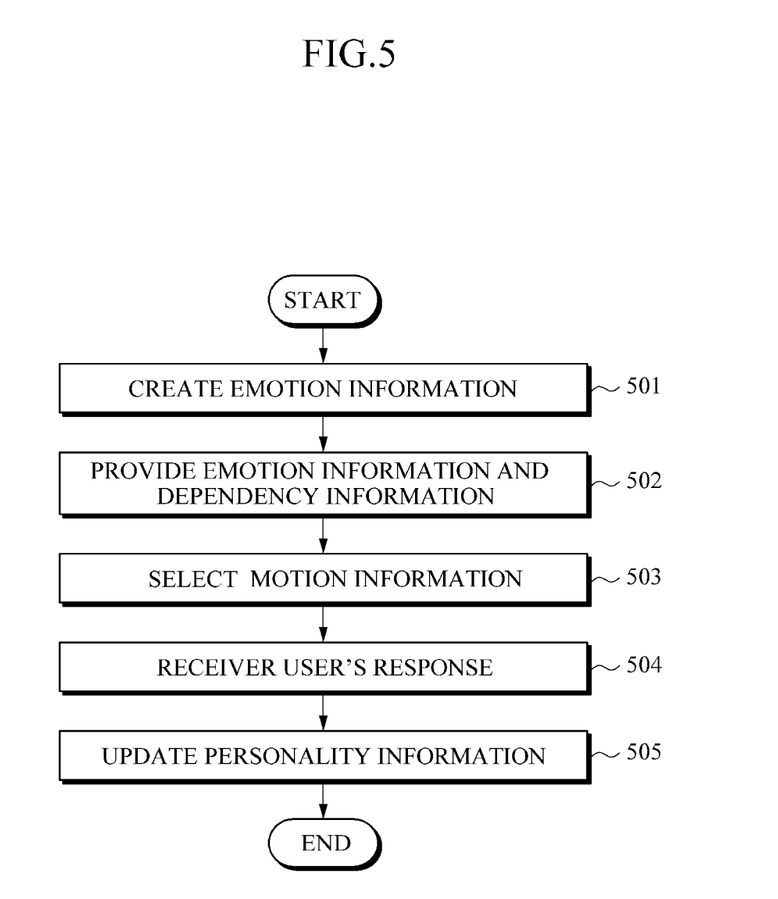
FIGS. 5 and 6 are flowcharts illustrating an example personality learning method.
Figure 6:
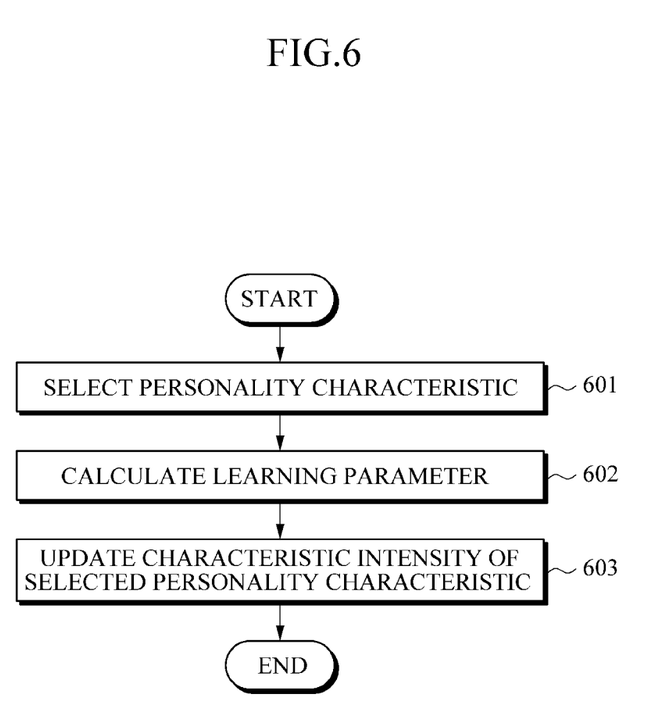

FIGS. 5 and 6 are flowcharts illustrating an example personality learning method.

Referring to FIGS. 1 and 5, first, emotion information is created according to personality information in response to a received external stimulus (operation 501). For example, the emotion creating unit 101 may generate a predetermined emotion parameter.

Then, the created emotion information and dependency information are provided (operation 502). For example, the emotion creating unit 101 may generate an emotion parameter and transfer the emotion parameter along with dependency information between the emotion parameter and personality information to the personality updating unit 104.

Successively, motion information is selected according to the emotion information (operation 503). For example, the motion selector 102 may receive the emotion parameter and select a predetermined motion parameter based on the emotion parameter. Optionally, the selected motion information may be transferred to the personality updating unit 104.

Then, a user's response is received in correspondence to a predetermined behavior performed according to the motion information (operation 504). For example, the user's response receiver 103 may receive a user's response and transfer the user's response to the personality updating unit 104.

Then, personality information may be updated based on the user's response (operation 505). For example, the personality updating unit 104 may update personality information stored in the emotion creating unit 101 based on the user's response.

The process of updating personality information will be described in more detail with reference to FIG. 6, below.

Referring to FIGS. 3 and 6, a personality characteristic that is to be updated may be selected (operation 601). For example, the learning controller 303 may decide the i value of Equation 1 using emotion information stored in the first memory 301 and dependency information stored in the second memory 302. The emotion information and dependency information may be stored in the first and second memories 301 and 302, respectively, in operation 502 of FIG. 5.

Then, a learning parameter may be calculated based on the user's response (operation 602). For example, the learning controller 303 may update personality information using Equation 2.

Accordingly, the more interaction the emotion model 100 has with a user, the more adaptive to the user the personalities of the emotion model 100 become. For example, in the case of a robot which talks much due to having a "Extraversion" value which has initially been set high, the robot will receive many negative responses from a user who wants a reserved robot, and as a result, these many interactions with the user will make the robot to reduce the "Extroversion value". In addition, emotion information values having dependency to the "Extraversion" value will be accordingly reduced and the intensities of the corresponding behaviors also will be lowered. Consequentially, the robot will come to have the personality desired by the user over time.

Figure 7:
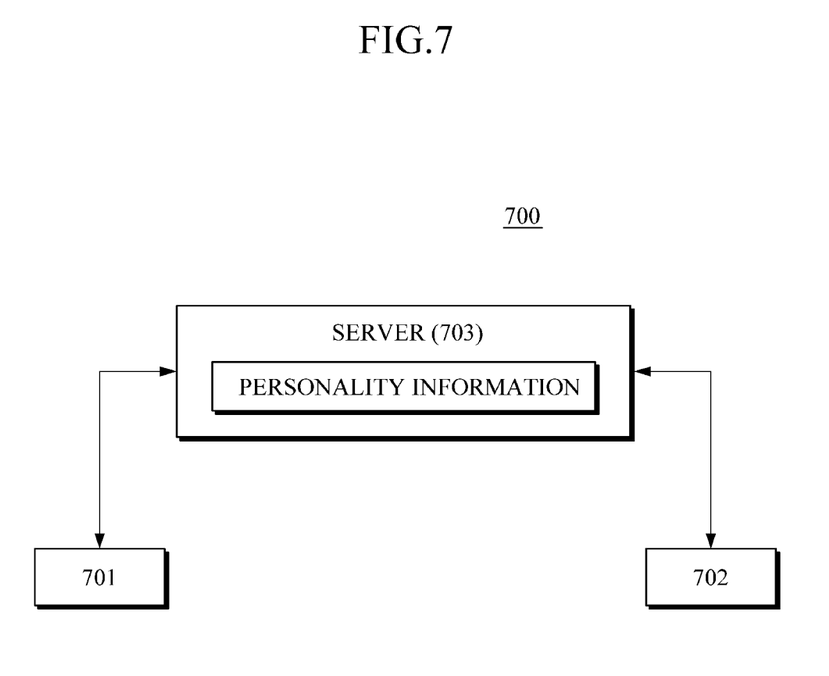
FIG. 7 is a block diagram schematically illustrating an example emotion model system.

FIG. 7 is a block diagram schematically illustrating an example emotion model system 700.

Referring to FIG. 7, the emotion model system 700 includes a server 703 and a plurality of emotion models. In the current embodiment, the plurality of emotion models may be first and second emotion models 701 and 702. Each of the first and second emotion models 701 and 702 may correspond to the emotion model 100 described above and are each connected to the server 703. Also, the server 703 may store personality information of the first and second emotion models 701 and 702 and the first and second emotion models 701 and 702 may share the personality information stored in the server 703.

For example, when a user interacts with the first emotion model 701, personality information stored in the server 703 may be updated. Thereafter, if the user uses the second emotion model 702, a behavior of the second emotion model 702 may be decided based on the updated personality information, and the personality information is again updated by receiving the user's response to the behavior. That is, since the emotion models 701 and 702 share the same personality information stored in the server 703, they become similar.

In the case where several users interact with the first emotion model 701, the server 703 may manage personality information for the individual users, separately.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An emotion modeling system, comprising:
a processor configured to:
  store personality information; and
  create emotion information based on the personality information;
a motion selector configured to select motion information for deciding a motion, based on the emotion information;
a user's response receiver configured to receive a user's response to the motion corresponding to the motion information; and
a personality updating unit configured to:
  create a learning parameter for the personality information using the user's response; and
  update the personality information using the learning parameter, wherein
  the learning parameter is inversely proportional to $(1+e^{-sx})$, where "x" is a value representing the intensity of the user's response and "s" is a value for adjusting the speed of learning.

2. The emotion modeling system of claim 1, wherein:
the emotion creating unit is further configured to provide dependency information, the dependency information comprising a dependency relationship between the personality information and the emotion information, to the personality updating unit; and
at least one of the emotion creating unit and the motion selector is further configured to provide the emotion information to the personality updating unit.

3. The emotion modeling system of claim 2, wherein the personality updating unit is further configured to:
select personality information to be updated, using the emotion information and the dependency information;
create a learning parameter for the selected personality information using the received user's response; and
update the selected personality information using the learning parameter.

4. The modeling system of claim 1, wherein:
the user's response is classified as a positive response or a negative response of a particular intensity; and
the personality updating unit is further configured to classify the user's response as the positive response or the negative response with reference to a response classification tree.

5. The emotion modeling system of claim 1, wherein:
the personality information comprises a personality characteristic and an intensity for the personality characteristic; and
the gain amount adjusts the intensity of the personality characteristic.

6. The emotion modeling system of claim 1, wherein:
the learning parameter is derived from the relation:

$$G(x) = \frac{a}{1+e^{-sx}} \cdot (-1)^r, (x \neq 0, \text{ if } x = 0, G(x) = 0),$$

G(x) is the learning parameter, "x" is a negative or positive value representing the intensity of the user's response, "a" is a gain amount, and "r" is an even number if the user's response is positive and an odd number if the user's response is negative.

7. A personality learning apparatus for an emotion model, comprising:
a non-transitory first memory configured to store:
  emotion information created based on personality information; and
  a user's response to a motion corresponding to motion information selected based on the emotion information;
a second memory configured to store dependency information relating to a dependency relationship between the emotion information and the personality information; and
a learning controller configured to:
  select personality information to be updated, using the emotion information and the dependency information,
  generate a learning parameter for the selected personality information using the user's response; and
update the selected personality information using the learning parameter, wherein
the learning parameter is inversely proportional to $(1+e^{-sx})$, where "x" is a value representing the intensity of the user's response and "s" is a value for adjusting the speed of learning.

8. The personality learning apparatus of claim 7, wherein:
the user's response is classified as a positive response or a negative response of a particular intensity; and
the second memory unit is further configured to store a response classification tree to classify the user's response.

9. The personality learning apparatus of claim 8, wherein the learning controller is further configured to classify the user's response as the positive response or the negative response with reference to the response classification tree.

10. The personality learning apparatus of claim 7, wherein:
the personality information comprises a personality characteristic and an intensity for the personality characteristic; and the gain amount adjusts the intensity of the personality characteristic.

11. The personality learning apparatus of claim 7, wherein: the learning parameter is derived from the relation:

$$G(x) = \frac{a}{1+e^{-sx}} \cdot (-1)^r, (x \neq 0, \text{ if } x = 0, G(x) = 0),$$

G(x) is the learning parameter, "x" is a negative or positive value representing the intensity of the user's response, "a" is a gain amount, and "r" is an even number if the user's response is positive and an odd number if the user's response is negative.

12. A personality learning method which is performed by an emotion model, the method comprising:
creating, with a processor, emotion information based on personality information;
selecting motion information for deciding a motion, based on the emotion information;
receiving a user's response to the motion corresponding to the motion information; and
selecting personality information to be updated using the emotion information and dependency information, the dependency information relating to a dependency relationship between the personality information and the emotion information;
generating a learning parameter for the selected personality information using the user's response; and
updating the selected personality information using the learning parameter, wherein
the learning parameter is inversely proportional to $(1+e^{-sx})$, where "x" is a value representing the intensity of the user's response and "s" is a value for adjusting the speed of learning.

13. The personality learning method of claim 12, wherein the updating of the personality information comprises classifying the user's response as a positive response or a negative response of a particular intensity.

14. The personality learning method of claim 12, wherein:
the personality information comprises a personality characteristic and an intensity for the personality characteristic; and the gain amount adjusts the intensity of the personality characteristic.

15. The personality learning method of claim 12, wherein: the learning parameter is derived from the relation:

$$G(x) = \frac{a}{1+e^{-sx}} \cdot (-1)^r, (x \neq 0, \text{ if } x = 0, G(x) = 0),$$

G(x) is the learning parameter, "x" is a negative or positive value representing the intensity of the user's response, "a" is a gain amount, and "r" is an even number if the user's response is positive and an odd number if the user's response is negative.

16. A personality learning method which is performed by an emotion model, the method comprising:
selecting, with a processor, a personality characteristic of personality information to be updated, using emotion information and dependency information relating to a dependency relationship between the emotion information and the personality information;
generating a learning parameter for the selected personality characteristic using a user's response; and
updating an intensity of the selected personality characteristic using the learning parameter, wherein
the learning parameter is inversely proportional to $(1+e^{-sx})$, where "x" is a value representing the intensity of the user's response and "s" is a value for adjusting the speed of learning.

17. The personality learning method of claim 16, wherein the generating of the learning parameter comprises classifying the user's response as a positive response or a negative response of a particular intensity.

18. The personality learning method of claim 16, wherein: the learning parameter is derived from the relation:

$$G(x) = \frac{a}{1+e^{-sx}} \cdot (-1)^r, (x \neq 0, \text{ if } x = 0, G(x) = 0),$$

G(x) is the learning parameter, "x" is a negative or positive value representing the intensity of the user's response, "a" is a gain amount, and "r" is an even number if the user's response is positive and an odd number if the user's response is negative.

* * * * *